(12) United States Patent
Cheatham et al.

(10) Patent No.: US 7,324,220 B1
(45) Date of Patent: Jan. 29, 2008

(54) PRINT PERFORMANCE UNDER THE WINDOWS® OPERATING SYSTEM

(75) Inventors: Walter Louis Cheatham, Lexington, KY (US); Dean Andrew Pulsifer, Lexington, KY (US); Richard Francis Russell, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1227 days.

(21) Appl. No.: 09/901,263

(22) Filed: Jul. 9, 2001

(51) Int. Cl.
*G06F 15/00* (2006.01)
*G06K 1/00* (2006.01)

(52) U.S. Cl. ............... 358/1.13; 358/1.15; 358/1.16; 358/1.9; 358/1.6; 358/523; 358/500; 370/389; 710/58

(58) Field of Classification Search ............... 358/1.14, 358/1.15, 1.16, 1.9, 1.1, 1.13, 1.6, 500, 523; 700/223, 235; 710/36, 52, 107, 57, 58; 709/229; 400/61; 370/389
See application file for complete search history.

(56) References Cited

U.S. PATENT DOCUMENTS

| | | | |
|---|---|---|---|
| 5,371,888 A | 12/1994 | Lehnertz et al. | |
| 5,425,135 A | 6/1995 | Motoyama et al. | |
| 5,511,152 A * | 4/1996 | Lai et al. .................. | 358/1.16 |
| 5,539,917 A | 7/1996 | Jirgal | |
| 5,557,707 A * | 9/1996 | Inoue et al. ................. | 358/1.6 |
| 5,566,306 A | 10/1996 | Ishida | |
| 5,596,426 A * | 1/1997 | Ueno et al. ................. | 358/500 |
| 5,602,974 A | 2/1997 | Shaw et al. | |
| 5,623,688 A | 4/1997 | Ikeda et al. | |
| 5,629,781 A * | 5/1997 | Ueno et al. ................. | 358/523 |
| 5,630,029 A | 5/1997 | Kosukegawa | |
| 5,640,495 A | 6/1997 | Colbert et al. | |
| 5,721,922 A | 2/1998 | Dingwall | |
| 5,732,198 A | 3/1998 | Deppa et al. | |
| 5,732,269 A | 3/1998 | Compton et al. | |
| 5,752,081 A | 5/1998 | Jirgal | |
| 5,764,869 A | 6/1998 | Bagley et al. | |
| 5,768,487 A | 6/1998 | LeClair et al. | |
| 5,784,177 A | 7/1998 | Sanchez et al. | |
| 5,799,206 A * | 8/1998 | Kitagawa et al. ............. | 710/36 |
| 5,809,255 A | 9/1998 | Amada et al. | |
| 5,819,112 A | 10/1998 | Kusters | |
| 5,825,991 A | 10/1998 | Plakosh et al. | |
| 5,835,788 A | 11/1998 | Blumer et al. | |
| 5,838,888 A | 11/1998 | Oda | |
| 5,842,044 A | 11/1998 | No | |
| 5,845,058 A | 12/1998 | Shaw et al. | |
| 5,864,652 A * | 1/1999 | Murahashi ................. | 358/1.16 |
| 5,867,633 A | 2/1999 | Taylor, III et al. | |
| 5,872,640 A | 2/1999 | Cohen et al. | |
| 5,881,213 A | 3/1999 | Shaw et al. | |
| 5,892,976 A | 4/1999 | Jirgal | |
| 5,914,737 A | 6/1999 | Silverbrook | |
| 5,915,127 A * | 6/1999 | Ogawa et al. ................. | 710/58 |
| 5,930,464 A | 7/1999 | Nakayama et al. | |
| 5,953,501 A | 9/1999 | Hattori | |
| 5,960,168 A | 9/1999 | Shaw et al. | |

(Continued)

*Primary Examiner*—Douglas Q. Tran
*Assistant Examiner*—Satwant Singh
(74) *Attorney, Agent, or Firm*—Needle & Rosenverg, P.C.

(57) ABSTRACT

The present invention relates to a print subsystem architecture in which a port monitor buffers data received from a spooler and asynchronously reads the buffered print data and transmits it to a printer.

16 Claims, 7 Drawing Sheets

U.S. PATENT DOCUMENTS

| | | |
|---|---|---|
| 5,974,477 A | 10/1999 | Kobayashi |
| 5,982,996 A | 11/1999 | Snyders |
| 6,003,069 A | 12/1999 | Cavill |
| 6,038,033 A | 3/2000 | Bender et al. |
| 6,097,499 A | 8/2000 | Casey et al. |
| 6,147,765 A | 11/2000 | Yoneda |
| 6,311,237 B1 * | 10/2001 | Suzuki et al. ............... 710/52 |
| 6,337,746 B1 * | 1/2002 | Coyle et al. ............. 358/1.15 |
| 6,392,758 B2 * | 5/2002 | Hines ...................... 358/1.9 |
| 6,433,882 B1 * | 8/2002 | Mori et al. ............. 358/1.13 |
| 6,474,881 B1 * | 11/2002 | Wanda ...................... 400/61 |
| 6,549,947 B1 * | 4/2003 | Suzuki ...................... 709/229 |
| 6,580,966 B2 * | 6/2003 | Shimada .................... 700/223 |
| 6,618,157 B2 * | 9/2003 | Coyle et al. ............... 358/1.1 |
| 6,665,587 B2 * | 12/2003 | Leone et al. ............... 700/235 |
| 6,697,898 B1 * | 2/2004 | Shishizuka et al. ......... 710/107 |
| 6,745,265 B1 * | 6/2004 | Sindalovsky ................ 710/57 |
| 6,775,020 B2 * | 8/2004 | Fukunaga et al. ......... 358/1.15 |
| 6,785,015 B1 * | 8/2004 | Smith et al. ............. 358/1.15 |
| 6,809,833 B1 * | 10/2004 | Blair et al. ............. 358/1.16 |
| 6,839,347 B1 * | 1/2005 | Ishida et al. ............. 370/389 |
| 6,856,412 B1 * | 2/2005 | Kaneko ...................... 358/1.14 |

* cited by examiner

PRINT PERFORMANCE UNDER THE WINDOWS® OPERATING SYSTEM

BACKGROUND OF THE INVENTION

1. Field of the Invention

The present invention relates generally to controlling printing in computers having a MICROSOFT WINDOWS®-type print architecture and, more specifically, to improving the efficiency with which the printer driver and related software elements provide print data to a printer.

2. Description of the Related Art

In a computer operating under the MICROSOFT WINDOWS operating system, an application program can initiate printing by generating a page description and transmitting it to the printer driver. The printer driver is software that operates in conjunction with the operating system and is typically provided by the printer manufacturer. The printer driver converts the page description into a printer-specific data stream.

The printer driver provides the printer-specific data to a spooler, which is part of the operating system. The printer driver typically generates print data in bands or sections, generating data for one part of the page, passing it on to the spooler, and the generating print data for the next part of the page. The printer driver continues this process until print data for the entire page has been generated. The port monitor, which is software that is also typically provided by the printer manufacturer, takes data from the spooler and delivers it to the printer attached to the computer. This combination of a printer driver, spooler and port monitor characterizes the print subsystem of WINDOWS operating systems (WINDOWS 95, WINDOWS 98, WINDOWS 2000, WINDOWS NT, WINDOWS Me, etc.).

The port monitor receives data from the spooler by invoking an application program interface (API) call or function call. The API call is of the blocking type. That is, the port monitor delivers all the data to the printer before returning control to the spooler. As a result of this blocking API call, during the time the port monitor is delivering data to the printer, printer driver operation is suspended. Printer driver operation is suspended because, although WINDOWS is a multi-tasking or multi-threading operating system, independent processes are not used in certain WINDOWS versions (e.g., WINDOWS 95, WINDOWS 98 and WINDOWS Me) to store data in the spooler and read data from the spooler. Rather, the spooler and printer driver operate in the above-mentioned alternating or sequential fashion under a single process: the printer driver generates print data and sends it to the spooler but then is idle or blocked until the port monitor has finished reading the data from the spooler and sending it on to the printer. Multi-threading is not used in this print mechanism because idiosyncrasies of certain versions of the WINDOWS operating system require that the printer driver be implemented in 16-bit code, and the 16-bit components of WINDOWS are not multi-threaded. Therefore, the printer driver is blocked while sending data.

It would be desirable to improve print performance and efficiency in a WINDOWS-type print architecture by minimizing the amount of time that elements of the print architecture are idle. It would further be desirable to do so without altering the WINDOWS operating system itself. The present invention addresses these problems and deficiencies and others in the manner described below.

SUMMARY OF THE INVENTION

The present invention relates to a print subsystem architecture in which a port monitor buffers data received from a spooler and asynchronously reads the buffered print data and transmits it to a printer.

When an application program initiates a print job, the port monitor receives print data from the spooler via a series of application program interface (API) calls. A portion of the print data is provided with each API call until all print data associated with the print job has been passed to the port monitor. A process launched when the print job is begun reads the print data stored in the buffer in a first-in-first-out manner and transmits it to the printer.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Figure 1:
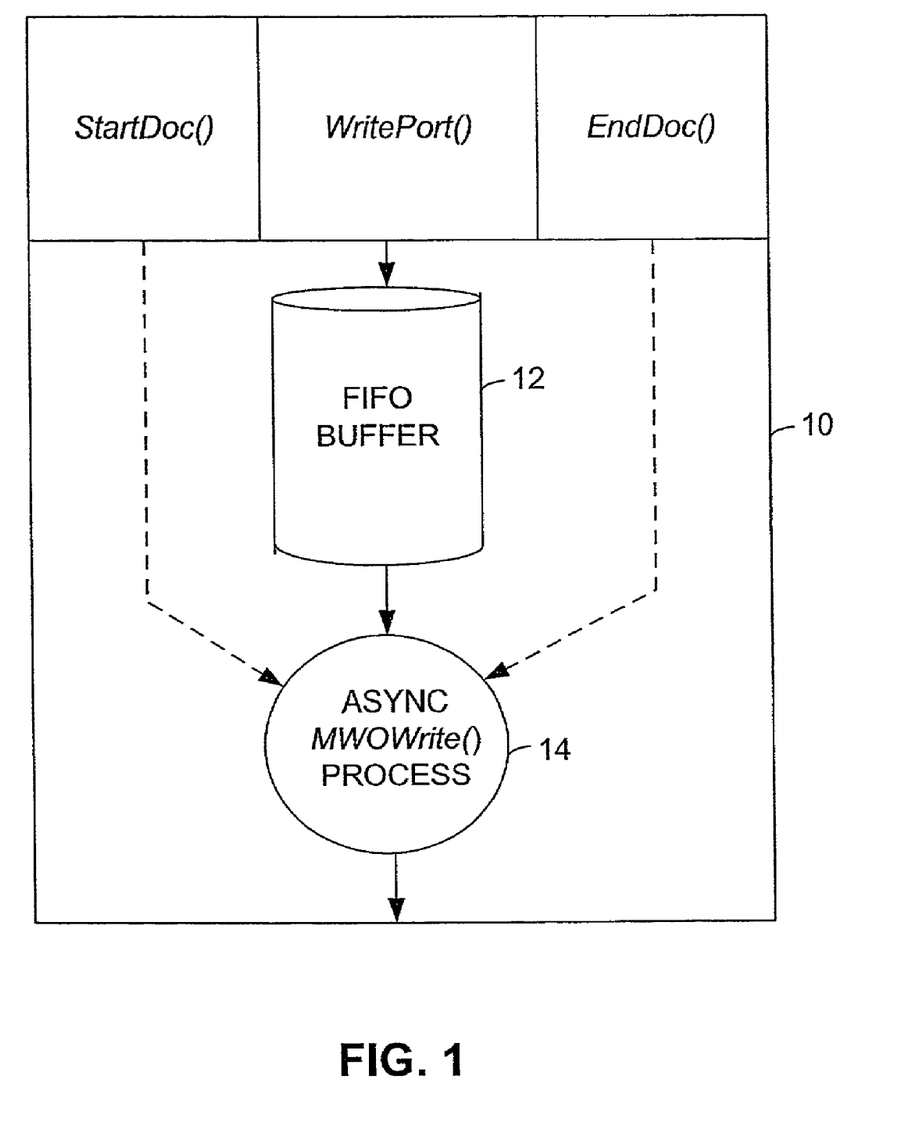
FIG. 1 illustrates a port monitor having a buffer and an application program interface.

As illustrated in FIG. 1, a novel port monitor 10 is included in a MICROSOFT WINDOWS®-type print subsystem and has a first-in-first-out (FIFO) buffer 12. A process 14 asynchronously reads the buffered print data and causes it to be transmitted to a printer 16 of the computer system, shown in FIG. 2. This buffering allows the printer driver 18 to generate the next batch of print data while port monitor 10 is causing print data to be delivered to printer 16.

Figure 2:
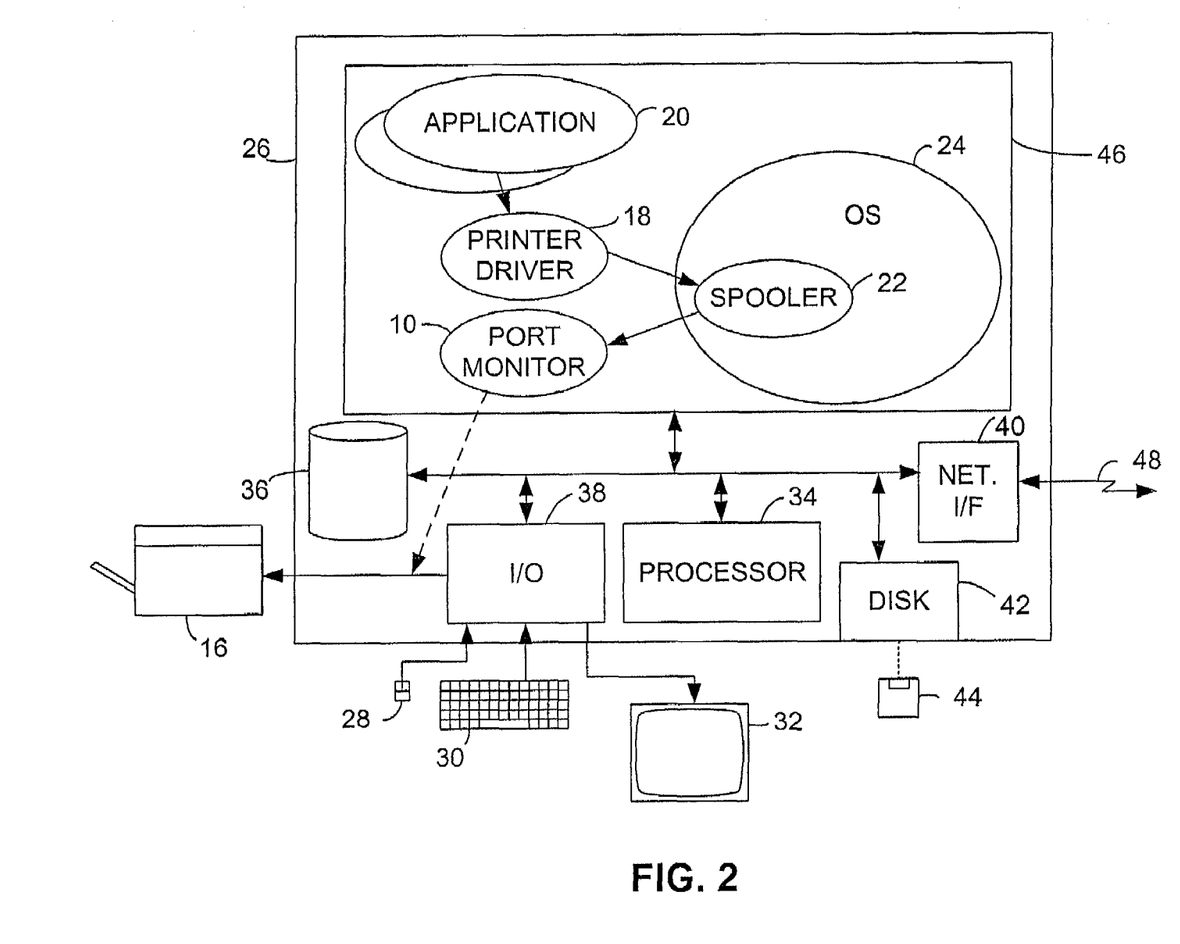
FIG. 2 is a block diagram of a computer system that prints in accordance with the present invention.

With reference to FIG. 2, when an application program 20 performs a print operation, it generates a page description and passes it to printer driver 18 in the conventional manner. As known in the art, printer driver 18 converts the page description into a data stream of whatever format is required by printer 16. Printer driver 18 and port monitor 10 are software commonly provided by the manufacturer of printer 16. Printer driver 18 can be of any suitable conventional type. Printer driver 18 passes the resulting print data to the spooler 22, which is part of the WINDOWS operating system 24 of the computer. (Although spooler 22 is the only component of operating system 24 illustrated in FIG. 2 for purposes of clarity, WINDOWS is complex and has many components, most of which are not relevant to the present invention and are therefore not explicitly illustrated.) Spooler 22, in turn, passes the print data on to port monitor 10 via an application program interface (API) in the conventional manner. The manner in which printer driver 18 and spooler 22 inter-operate to effect printing in a WINDOWS environment is well-known in the art and therefore not described in further detail in this patent specification. The above-described combination of printer driver 18, spooler 22 and port monitor 10 characterizes the print subsystem of certain WINDOWS operating systems (WINDOWS 95, WINDOWS 98, WINDOWS 2000, WINDOWS NT, WINDOWS Me, etc.). Nevertheless, the present invention is applicable to any operating system having this combination of elements or a combination providing similar functionality. It should also be noted that a component having a certain name in the context of one operating system, such as the WINDOWS "port monitor," may be called something else in the context of another operating system, and limitations upon the invention should not be inferred from any such inconsistency in terminology in and of itself. Rather, the term "port monitor," for example, is used herein to refer to anything having the same or similar function as the WINDOWS port monitor.

The computer system can include any suitable personal computer or other computer operating under WINDOWS operating system 24 or an operating system having a print subsystem architecture similar to that of WINDOWS. In this regard, the computer can include a processing unit 26 with which printer 16 is compatible, as well as conventional computer elements such as a mouse 28, keyboard 30 and display 32. Processing unit 26 includes hardware and software elements of the types generally included in conventional personal computers, such as a processor 34 or central processing unit (which includes any supporting hardware, firmware or other logic), a disk storage device 36 such as a hard disk drive, input/output interfaces 38, a network interface 40, and a removable read/write storage device 42 such as a drive that uses a CD-ROM or a floppy disk 44. The software elements of the programmed computer, such as application program 20, operating system 24, printer driver 18 and port monitor 10, are shown for purposes of clarity and illustration as executable in a main memory 46, but as persons skilled in the art understand they may not in actuality reside simultaneously or in their entireties in memory 46. Rather, they can be stored on disk storage device 36 and portions of them retrieved into main memory 46 on an as-needed basis under control of operating system 24. Furthermore, it should be understood that the computer has other hardware and software elements of the types conventionally included in personal computers but are not shown in FIG. 2 for purposes of clarity. Note that software elements, such as port monitor 10 and printer driver 18, can be loaded into the computer from another source via disk 44 or a network 48 or any other media suitable for carrying software. Similarly, such software elements can be transferred from the computer to another destination via disk 44 or network 48 or similar data media. Note that embodiments of the present invention include not only methods and systems but also computer program products in which port monitor 10, printer driver 18 or other software elements are carried on disk 44, network 48 or similar media.

The API through which spooler 22 interfaces with port monitor 10 can involve the following three major API calls: StartDoc( ), WritePort( ) and EndDoc( ), as conceptually illustrated in FIG. 1. (FIG. 1 is not intended to realistically depict any software, structure or process, but rather is a conceptual depiction of an amalgamation of such concepts intended to more clearly and understandably convey the essence of port monitor 10.) As persons skilled in the art to which the invention pertains will understand, port monitor 10 is software that can be written in any suitable programming language. Buffer 12 can be implemented in any suitable manner, such as a data structure. Although programming such data structures are design choices well-within the abilities of persons skilled in the art, suitable data structures can be defined in the C programming language in accordance with the following example:

struct_MWOBuffer {
    unsigned long dwBlockSize;
    void *pData;
    struct_MWOBuffer *pNext;
    struct_MWOBuffer *pPrior;
    }

Note that the data structures defining buffer 12 are doubly-linked lists named "MWOBuffer" and that, as such, there is no inherent limit upon storage space in it. Rather, the size of memory 46 and its utilization by other software elements is the limiting factor. Nevertheless, a limit can be imposed. For example, a 300 kilobyte (kB) limit was used in one embodiment of the invention because the printer driver did not generate a swath or band of print data that exceeded this size. One swath can therefore be buffered, and while printer driver 18 is generating the next swath, buffer 12 can be emptied via the MWOWrite( ) process described below. Also, the data structure is global in scope so that the StartDoc( ), WritePort( ), MWOWrite( ) and EndDoc( ) processes, described below, can all access it.

As will be further understood, port monitor 10 performs operations in addition to those described in this patent specification of the type that are performed by conventional port monitors. Such conventional operations are familiar to persons skilled in the art and are not described herein for purposes of clarity.

Figure 3:
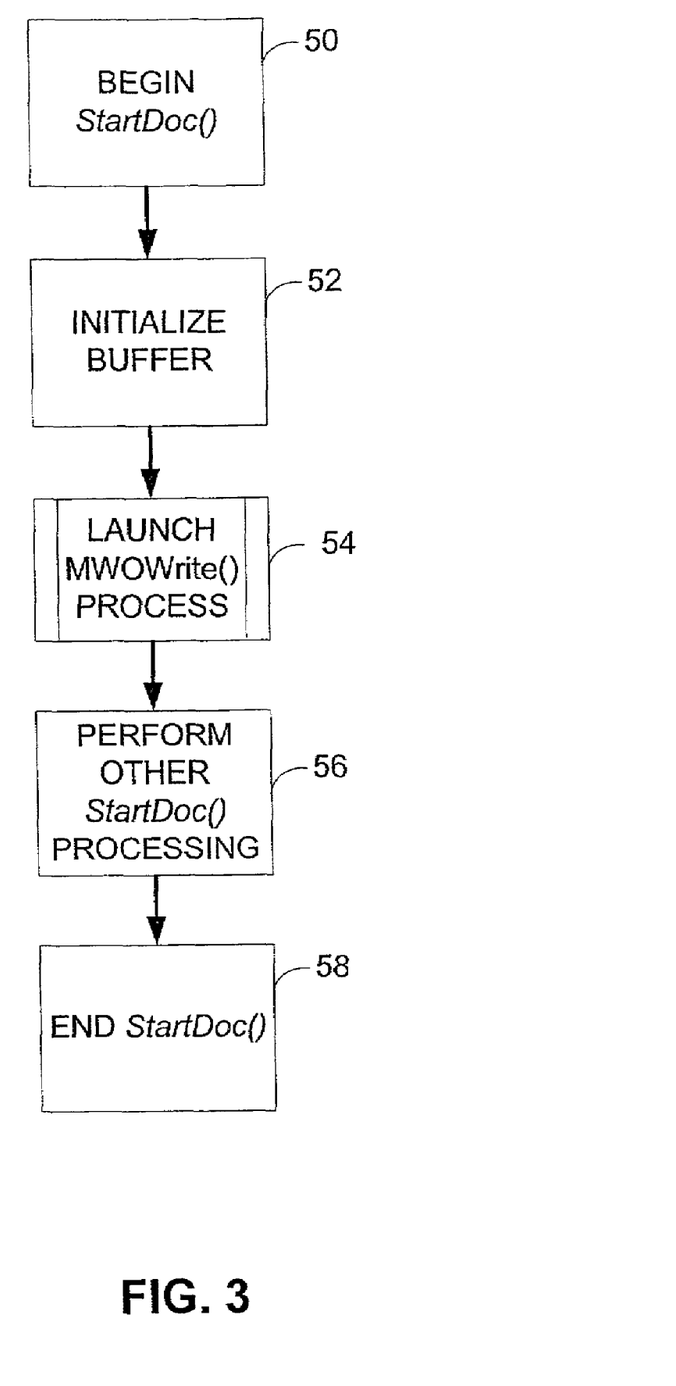
FIG. 3 is a flow diagram illustrating the steps of the print method performed when a print job is begun.

As illustrated in FIG. 3, spooler 22 calls StartDoc( ) at step 50 to notify port monitor 10 that a stream of print data is forthcoming. StartDoc( ) is a routine or code unit of port monitor 10 that performs the remaining steps illustrated. At step 52 it initializes buffer 12 (see code excerpt above) by setting a global root pointer to a null value, indicating that the data structure is empty. At step 54 it launches process 14, named "MWOWrite( )" in the illustrated embodiment of the invention, as indicated by the dashed line in FIG. 1. (The prefix "MWO" refers to Multi-Write Overlap, another name for the buffering process to which the invention relates.) Process 14 then operates independently and asynchronously from the StartDoc( ) process as described below. At step 56 it performs the additional processing noted above that is conventionally performed by WINDOWS port monitors. At step 58 the StartDoc( ) process terminates.

Figure 4:
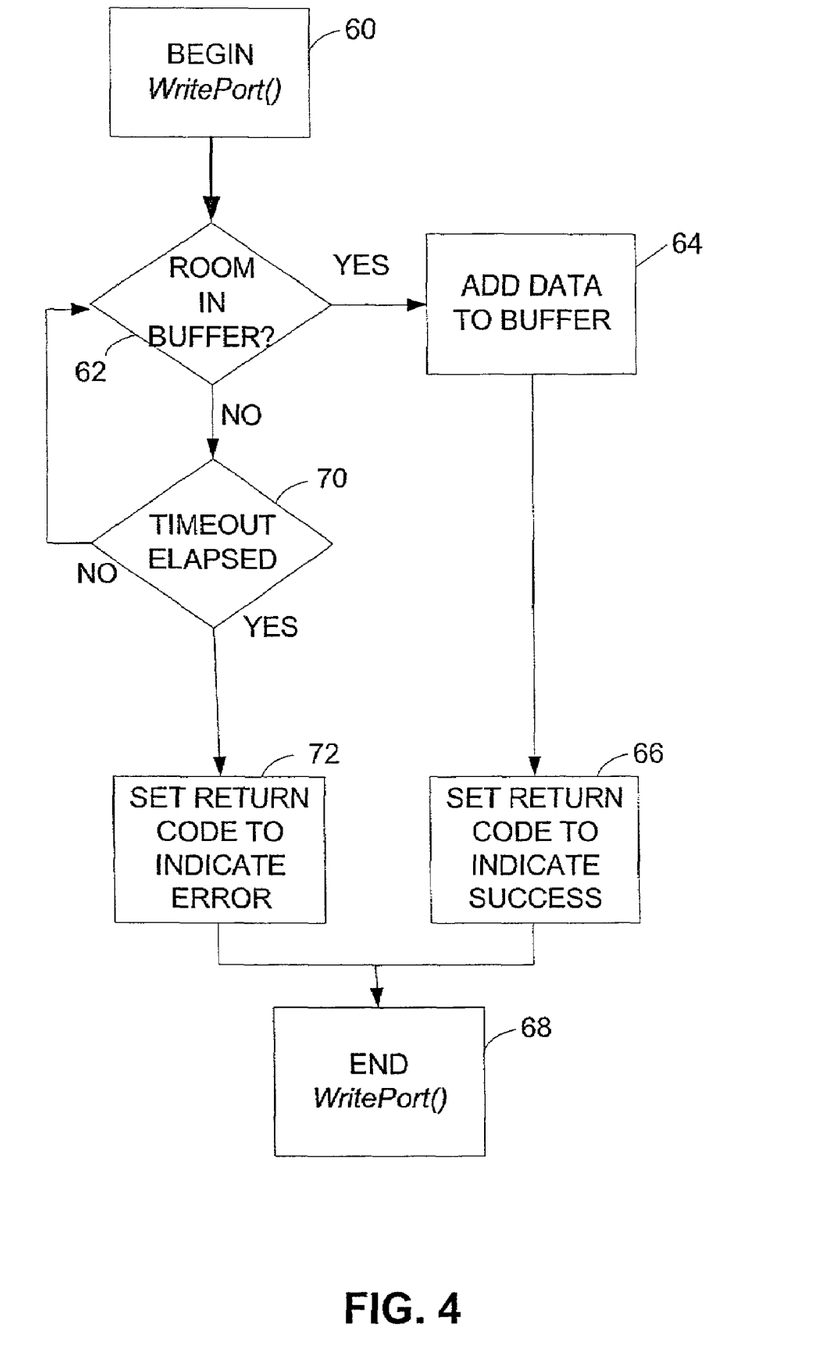
FIG. 4 is a flow diagram illustrating writing to the buffer.

As illustrated in FIG. 4, after calling the StartDoc( ) API, spooler 22 calls WritePort( ) at step 60, which transfers print data to port monitor 10. Spooler 22 calls WritePort( ) one or more times, until it has transferred all print data associated with the print job. WritePort( ) is a routine or code unit of port monitor 10 that performs the remaining steps illustrated. At step 62, it determines whether there is room or space in buffer 12 to accommodate the print data it received from spooler 22 via the API call. As noted above, there is no inherent space limitation due to the doubly-linked list structure, but a limit (e.g., 300 kB or other suitable size) can be imposed for convenience. If there is room, i.e., adding the print data will not overflow the buffer space, at step 64 it adds or writes the print data to buffer 12, and at steps 66 and 68, respectively, sets a return code to indicate a successful write and exits or returns from WritePort( ). The return from this API call returns control to spooler 22. If there is no room in buffer 12, then at step 70 it determines whether a timeout period has elapsed. The timeout ensures that a deadlock condition is avoided: If buffer 12 if full for any reason, i.e., it cannot accommodate the additional print data, the Write-Port( ) process waits (by looping back to step 62) a predetermined amount of time, such as ten seconds, for buffer 12 to empty sufficiently to accommodate the additional print data. If it does not empty within the timeout period, an error code is set at step 72, and control returns to the spooler at step 68. Note the improvement in performance over conventional WINDOWS printing: If there is room in buffer 12, the data are added immediately, and control is returned to spooler 12. Unlike a conventional WINDOWS print subsystem, return of control to spooler 12 is not delayed until the data are written to printer 16.

Figure 5:
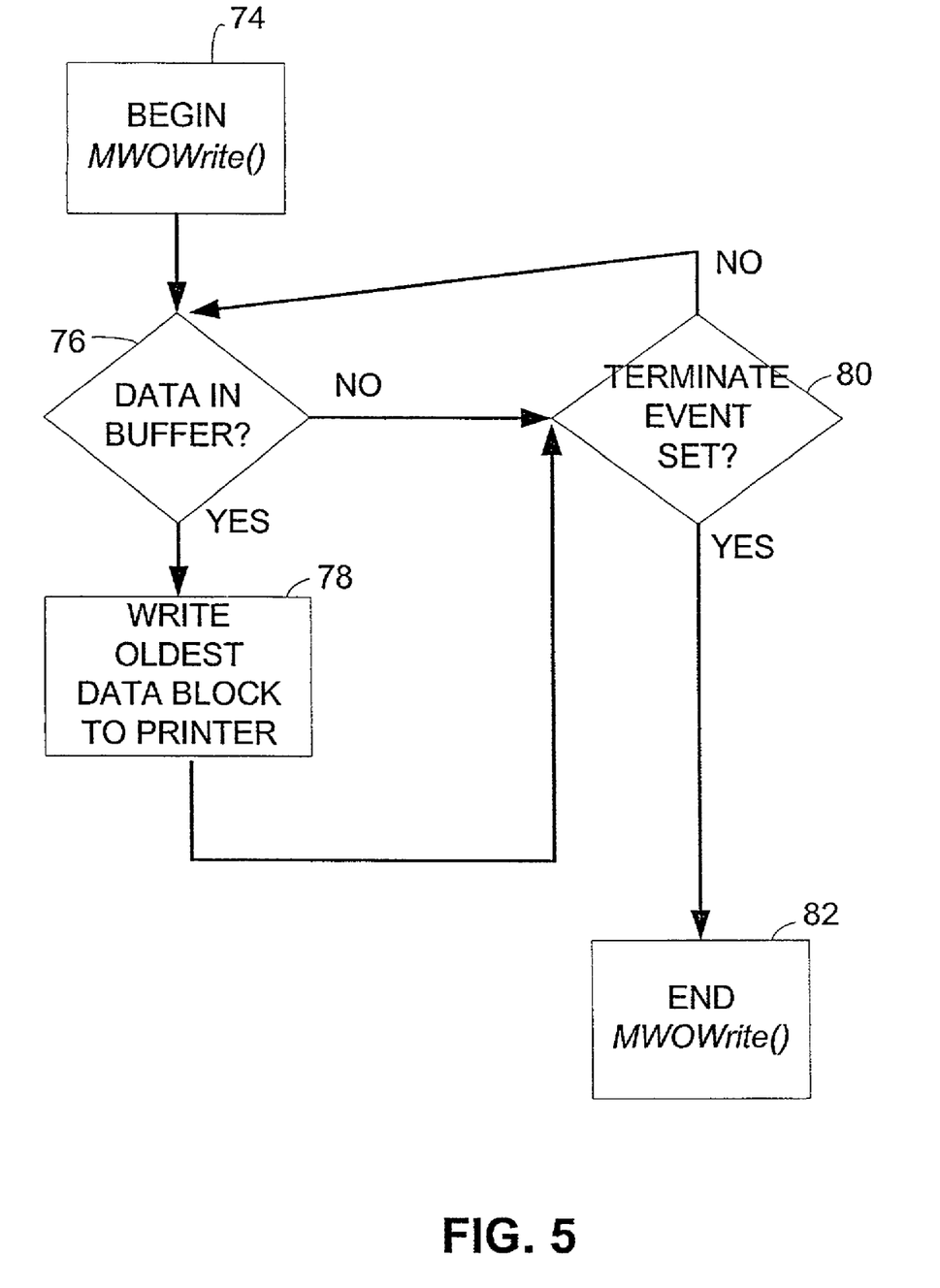
FIG. 5 is a flow diagram illustrating writing data from the buffer to a printer port.

As illustrated in FIG. 5, MWOWrite( ) process 14 begins at step 74. At step 76 process 14 determines whether there are data in buffer 12. If there are data in buffer 12, at step 78 process 14 writes the oldest data block in buffer 12 to printer 16 via the computer's I/O interfaces 38 (FIG. 2). The specific interface or port to which printer 16 is commonly coupled in many personal computers operating under WINDOWS is a universal serial bus (USB) port. As known to persons skilled in the art, the write operation to the USB port is typically performed using direct memory access (DMA). After a data block has been written to printer 16, or if there is no data in buffer 12, it is determined at step 80 whether a terminate event or signal has been set, as described below. If it receives this signal to terminate, process 14 terminates at step 82. Although a USB port is contemplated in the illustrated embodiment of the invention, in other embodiments of the invention the port can be of a type other than USB.

Figure 6:
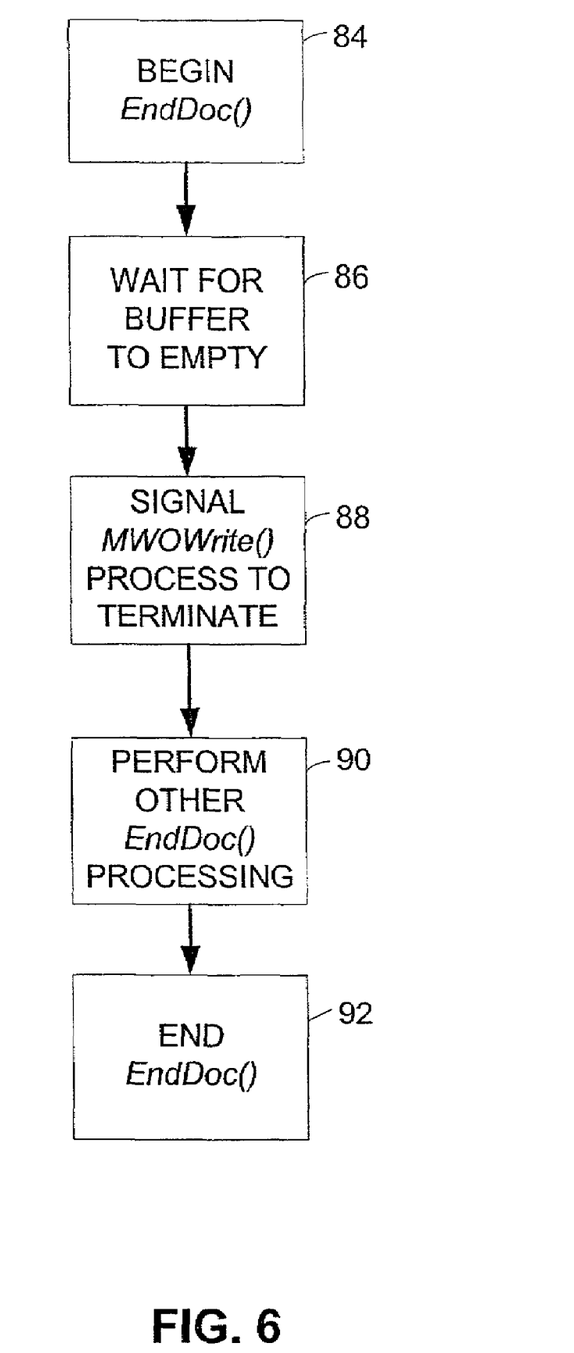
FIG. 6 is a flow diagram illustrating the steps of the print method performed when a print job is terminating.

As illustrated in FIG. 6, when spooler 22 has transferred all print data associated with the print job to port monitor 10, it calls EndDoc( ) at step 84. At step 86 the EndDoc( ) process waits until it determines that buffer 12 is empty, i.e., all print data have been written to printer 16 by MWOWrite( ) process 14. When buffer 12 is empty, at step 88 the EndDoc( ) process sets the above-mentioned event or signal that signals MWOWrite( ) process 14 (FIG. 1) to terminate. At step 90 it performs any additional processing of the type conventionally performed before a print job is terminated and with which persons skilled in the art are familiar. At step 92 it exits or returns control to spooler 22.

Figure 7:
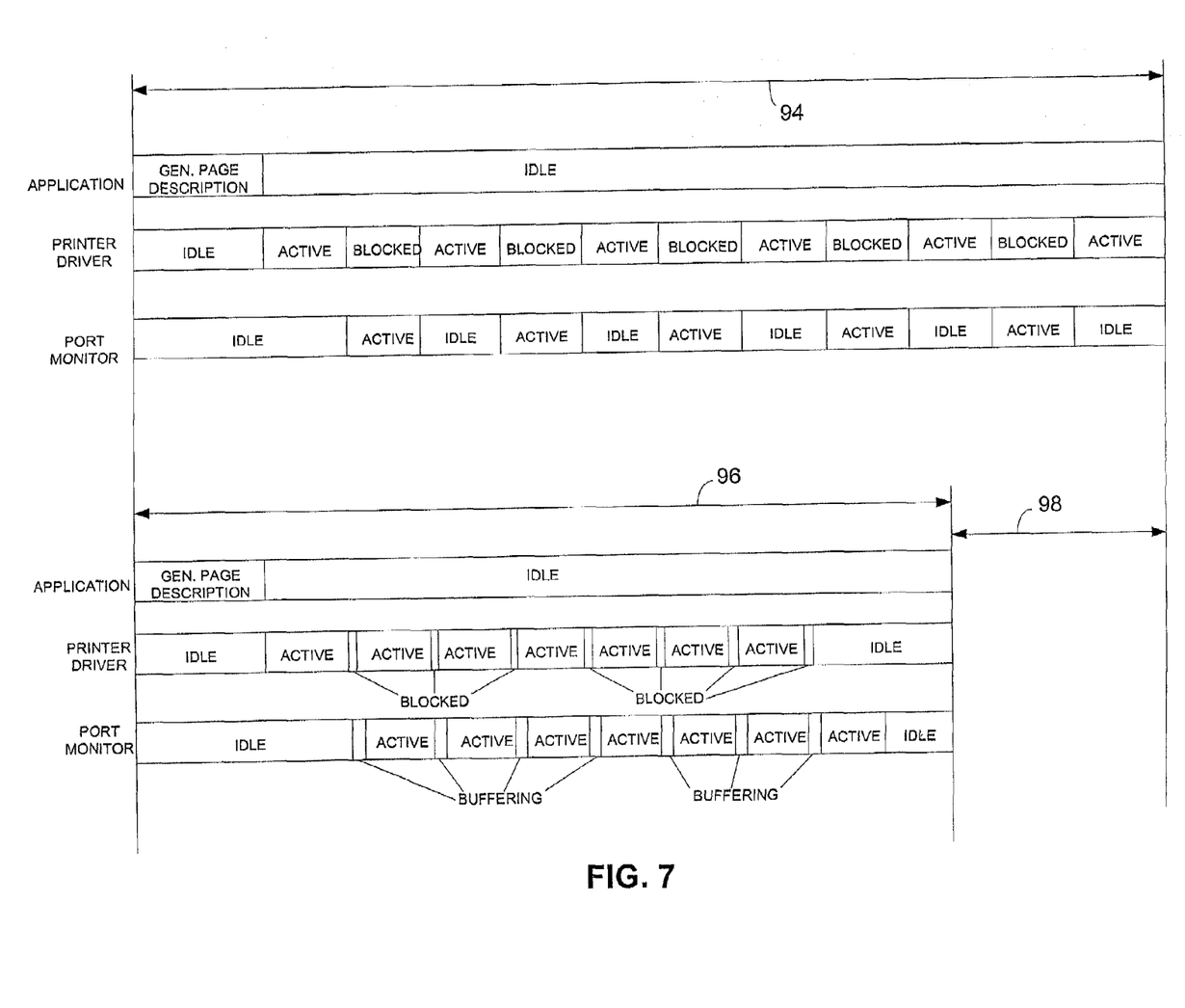
FIG. 7 illustrates the relative timing of print subsystem events in a prior art print subsystem architecture compared to the relative timing of events in a print subsystem architecture in accordance with present invention.

As illustrated in FIG. 7, the invention reduces total print job time from a conventional amount 94 to a reduced amount 96, thereby providing a significant savings 98. The upper three timelines in FIG. 7 illustrate the operation of a conventional WINDOWS-type print subsystem in which the printer driver is blocked while the port monitor delivers data to the printer port the data it previously received from the printer driver. (The spooler operation is not shown because no appreciable time is spent by it during this process; rather, it only hands off the print data from the printer driver to the port monitor. In the lower three timelines, it can be seen that the present invention reduces the duration of the print job by reducing the amount of time the printer driver spends in a blocked state. In accordance with the present invention, during the time the port monitor is delivering print data to the printer port, the printer driver is not blocked; rather, it is generating the next section of print data.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. For example, although the above-described embodiment relates to WINDOWS operating systems, those skilled in the art will, in view of the teachings set forth above, be able to make and use embodiments of the invention for other operating systems that have printing mechanisms similar to that of WINDOWS. It is intended that the specification and examples be considered as exemplary only, with a true scope and spirit of the invention being indicated by the following claims.

The invention claimed is:

1. A method for transmitting data to a printer in a computer system, comprising:
   in response to an application program initiating a print job, a port monitor receiving print data from a spooler of an operating system of the computer system via an application program interface (API), the spooler providing the print data to the port monitor in portions via multiple API calls until all print data associated with the print job has been passed to the port monitor;
   the port monitor having a buffer and storing the print data received from the spooler in the buffer; and
   asynchronously with storage of print data in the buffer, reading the print data stored in the buffer in a first-in-first-out manner and transmitting the print data to the printer.

2. The method claimed in claim 1, wherein:
   in response to an API call from the spooler indicating a start of a document, the port monitor launches a process; and
   the step of reading the print data stored in the spooler and transmitting the print data to the printer comprises the process monitoring buffer contents, reading buffer contents when the thread detects that the buffer contains print data, and transmitting the data read from the buffer to the printer.

3. The method claimed in claim 2, wherein in response to the API call from the spooler indicating a start of a document, the port monitor initializes the buffer.

4. The method claimed in claim 2, wherein if the process does not detect room in the buffer for print data within a predetermined timeout interval the process terminates.

5. The method claimed in claim 1, wherein the step of storing the print data in a buffer comprises storing the print data in a doubly-linked list.

6. The method of claim 5, wherein the buffer is allocated from system memory of the computing system.

7. The method claimed in claim 1, wherein in response to an API call from the spooler indicating completion of a document, the port monitor returns to the spooler from that API call when the buffer is empty.

8. The method of claim 1, wherein the buffer is allocated from system memory of the computing system.

9. A computer program product for transmitting data to a printer in a computer system, comprising computer data media carrying in computer-readable form:
   a print driver for converting a page description received from an application program into print data and providing the print data to a spooler; and
   a port monitor having a buffer allocated from system memory of the computing system, the buffer for receiving print data from the spooler in response to application program interface (API) calls, storing the print data in the buffer and, asynchronously with storage of print data in the buffer, reading the print data stored in the buffer in a first-in-first-out manner and transmitting the print data to the printer.

10. The computer program product claimed in claim 9, wherein the port monitor monitors buffer contents, reads buffer contents when it detects that the buffer contains print data, and transmits the data read from the buffer to the printer.

11. The computer program product claimed in claim 10, wherein the port monitor initializes the buffer in response to an API call from the spooler indicating a start of a document.

12. The computer program product claimed in claim 10, wherein the port monitor includes a timeout timer that is triggered if room in the buffer for print data is not detected within a predetermined timeout interval.

13. The computer program product claimed in claim 9, wherein the port monitor stores the print data in a doubly-linked list.

14. The computer program product claimed in claim 9, wherein in response to an API call from the spooler indicating completion of a document, the port monitor returns to the spooler from that API call when the buffer is empty.

15. A method for transmitting data to a printer in a computer system, comprising:

in response to an application program initiating a print job, a port monitor receiving print data from a spooler of an operating system of the computer system via an application program interface (API);

the port monitor having a buffer and storing the print data received from the spooler in the buffer, wherein the buffer is allocated from system memory; and asynchronously with storage of print data in the buffer, reading the print data stored in the buffer in a first-in-first-out manner and transmitting the print data to the printer.

16. The method of claim 15, wherein the buffer is organized as a doubly-linked list.

\* \* \* \* \*